United States Patent
Khovaylo et al.

(10) Patent No.: US 6,172,360 B1
(45) Date of Patent: *Jan. 9, 2001

(54) SCANNER HAVING BACK-SIDE WINDOW AND METHOD FOR USING THE SCANNER

(75) Inventors: Modest Khovaylo, Fort Collins; Michael A. Puyot, Greeley; James C. Dow, Fort Collins, all of CO (US); Scott Henderson, Brooklyn; Davin Stowell, New York, both of NY (US)

(73) Assignee: Hewlett-Packard Company, Palo Alto, CA (US)

(*) Notice: Under 35 U.S.C. 154(b), the term of this patent shall be extended for 0 days.

This patent is subject to a terminal disclaimer.

(21) Appl. No.: 09/496,390

(22) Filed: Feb. 2, 2000

Related U.S. Application Data (63) Continuation of application No. 09/082,847, filed on May 21, 1998, now Pat. No. 6,040,572.

(51) Int. Cl.$^7$ .................................................. H01J 3/14
(52) U.S. Cl. .................. 250/235; 250/234; 250/239; 250/208.1; 348/376; 358/505; 358/506; 358/400; D14/116
(58) Field of Search .................................. 250/235, 234, 250/239, 208.1; 348/373, 376; 358/505, 506, 400, 401, 497, 494, 514, 513, 483, 482, 474, 471; D14/116

(56) References Cited

U.S. PATENT DOCUMENTS

| | | | |
|---|---|---|---|
| 4,709,144 | * 11/1987 | Vincent | 250/226 |
| 4,870,268 | * 9/1989 | Vincent et al. | 250/226 |
| 4,918,632 | * 4/1990 | York | 364/708 |
| 4,926,041 | * 5/1990 | Boyd | 250/226 |
| 5,038,028 | * 8/1991 | Boyd et al. | 250/208.1 |
| 5,227,620 | * 7/1993 | Elder, Jr. et al. | 250/208 |
| 5,857,133 | * 1/1999 | Sun | 399/211 |
| 6,040,572 | * 3/2000 | Khovaylo et al. | 250/235 |

* cited by examiner

*Primary Examiner*—John R. Lee (57) ABSTRACT

Scanner apparatus may comprise a housing having a front side with an opening therein, a back side with an opening therein and a scanning device mounted within the housing. A transparent platen mounted within the opening in the front side of the housing allows an object positioned adjacent the scanning device so that the object may be thereafter scanned. A transparent window mounted within the opening in the back side of the housing allows a user to view at least a portion the object positioned adjacent the transparent platen.

20 Claims, 4 Drawing Sheets

SCANNER HAVING BACK-SIDE WINDOW AND METHOD FOR USING THE SCANNER

CROSS-REFERENCE TO RELATED APPLICATION

This is a continuation of U.S. patent application Ser. No. 09/082,847, filed on May 21, 1998, now U.S. Pat. No. 6,040,572, which is incorporated herein by reference for all that it discloses.

FIELD OF INVENTION

This invention relates to scanner devices in general and more specifically to flatbed scanner devices.

BACKGROUND

Scanner devices, such as flatbed scanners, are well-known in the art and produce machine-readable image data signals that are representative of a scanned object, such as a photograph or a page of printed text. In a typical scanner application, the image data signals produced by a scanner may be used by a personal computer to reproduce an image of the scanned object on a suitable display device, such as a CRT or a printer.

A typical flatbed scanner may include illumination and optical systems to accomplish scanning of the object. The illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. Image data representative of the entire object then may be obtained by sweeping the scan line across the entire object, usually by moving the illumination and optical systems with respect to the object.

By way of example, the illumination system may include a light source (e.g., a fluorescent or incandescent lamp or an array of light emitting diodes (LEDs)). The optical system may include a lens and/or mirror assembly to focus the image of the illuminated scan line onto the surface of the detector. Alternatively, a "contact image sensor" (CIS) may be used to collect and focus light from the illuminated scan region onto the detector.

The photosensitive detector used to detect the image light focused thereon by the optical system may be a charge-coupled device (CCD), although other devices may be used. A typical CCD may comprise an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots on an image focused thereon.

Flatbed scanners and various components thereof are disclosed in U.S. Pat. No. 4,926,041 for OPTICAL SCANNER of David Wayne Boyd; U.S. Pat. No. 4,709,144 for COLOR IMAGER UTILIZING NOVEL TRICHROMATIC BEAM SPLITTER AND PHOTOSENSOR of Kent J. Vincent; U.S. Pat. No. 4,870,268 for COLOR COMBINER AND SEPARATOR AND IMPLEMENTATIONS of Kent J. Vincent and Hans D. Neuman; U.S. Pat. No. 5,038,028 for OPTICAL SCANNER APERTURE AND LIGHT SOURCE ASSEMBLY of Boyd, et al.; and U.S. Pat. No. 5,227,620 for APPARATUS FOR ASSEMBLING COMPONENTS OF COLOR OPTICAL SCANNERS of Elder, et al., which are each hereby specifically incorporated by reference for all that is disclosed therein.

While flatbed scanners are well-known and are being used, they tend to have a rather large "footprint" thus occupy a substantial amount of space wherever they may be placed (e.g., a desk or a table). Further, since most flatbed scanners need to be connected to various external devices (e.g., wall outlets and personal computers) by one or more cords and cables, most users tend to resist moving the scanner unless absolutely necessary. Indeed, many users tend to regard flatbed scanners as "fixtures" on the desk or table on which they are placed.

Another problem with flatbed scanners is that it can be difficult to scan large items, such as maps or large drawings. Consider, for example, a situation where a user desires to scan only a portion of a large map that is several times the size of the platen (i.e., scan area) of the flatbed scanner. Typically the user will examine the desired area on the map, then turn the map face down on the platen of the scanner. The user may then peel back a portion of the upside down map to check the alignment of the desired portion with respect to the platen. Unfortunately, it is sometimes difficult to confirm correct alignment since the user is looking at the image upside down. Therefore, while this "place and peek" method may eventually yield good results, it usually does so only after several attempts by the user. In the meantime, the user may have wasted considerable time and processing capacity (associated with displaying the scanned image) before the desired portion of the map has been scanned. The chances for success using the foregoing "place and peek" method may also diminish considerably if the portion to be scanned is approximately the same size as the scanner platen. In such cases it is almost inevitable that some slight positioning error will cause a portion of the desired area to extend beyond the bounds of the platen, thus not be scanned.

SUMMARY OF THE INVENTION

Scanner apparatus may comprise a housing having a front side with an opening therein, a back side with an opening therein and a scanning device mounted within the housing. A transparent platen mounted within the opening in the front side of the housing allows an object positioned adjacent the scanning device so that the object may thereafter be scanned. A transparent window mounted within the opening in the back side of the housing allows a user to view at least a portion the object positioned adjacent the transparent platen.

Also disclosed is a method for scanning an object that comprises the steps of: positioning a transparent platen of a scanner apparatus against the object; viewing at least a portion of the object positioned against the transparent platen of the scanner apparatus through a transparent window provided on a back side of the scanner apparatus to ensure that a desired portion of the object will be scanned by the scanner apparatus; and operating the scanner apparatus to scan the object.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
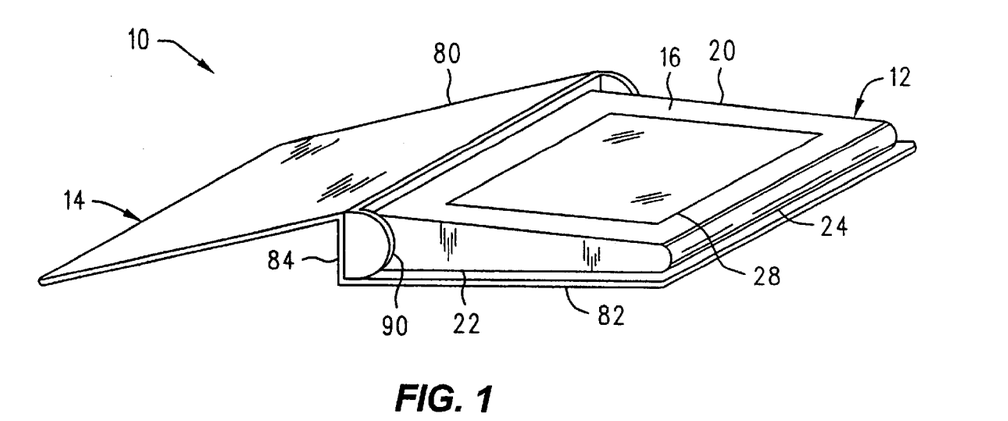
FIG. 1 is a perspective view of a scanner apparatus according to the present invention with the front cover of the jacket opened to expose the transparent platen on the front side of the scanner housing.
Figure 2:
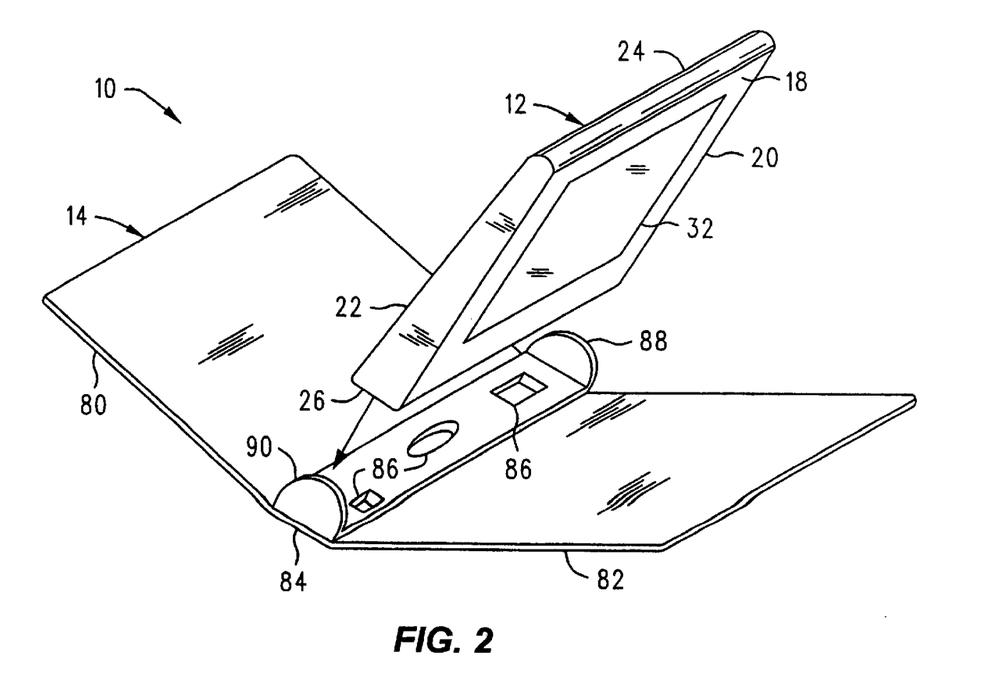
FIG. 2 is a perspective view of the scanner apparatus shown removed from the jacket and also illustrating the window portion on the back side of the scanner housing.

A scanner apparatus 10 according to one preferred embodiment of the present invention is best seen in FIGS. 1 and 2 and may include a housing 12 sized to be received by a jacket 14. As will be described in greater detail below, the configuration of the housing 12 and jacket 14 is such that the combination emulates a notebook or multi-ring (e.g., 3-ring) binder of the type commonly used to store loose-leafed paper and other materials. The emulation of the ubiquitous notebook or multi-ring binder encourages users to store and carry the scanner apparatus 10 as if it were a conventional notebook or multi-ring binder.

The housing 12 of the scanner apparatus 10 includes a front side 16 and a back side 18 that are held in spaced-apart relation by a top side wall 20, a bottom side wall 22, an end side wall 24, and a spine wall 26. The front side 16 of housing 12 includes a transparent platen 28 which allows an object (not shown) positioned adjacent the platen 28 to be scanned by a scanning device 30 contained within the housing 12. The back side 18 of the housing 12 may be provided with a window portion 32 which will allow a user (not shown) to view at least a portion of the object positioned adjacent the transparent platen 28. As will be described in greater detail below, in certain applications the window portion 32 on the back side 18 of housing 12 greatly enhances the ability of the user to align the scanner device 10 with respect to the object so that the desired portion of the object is scanned.

Figure 5:
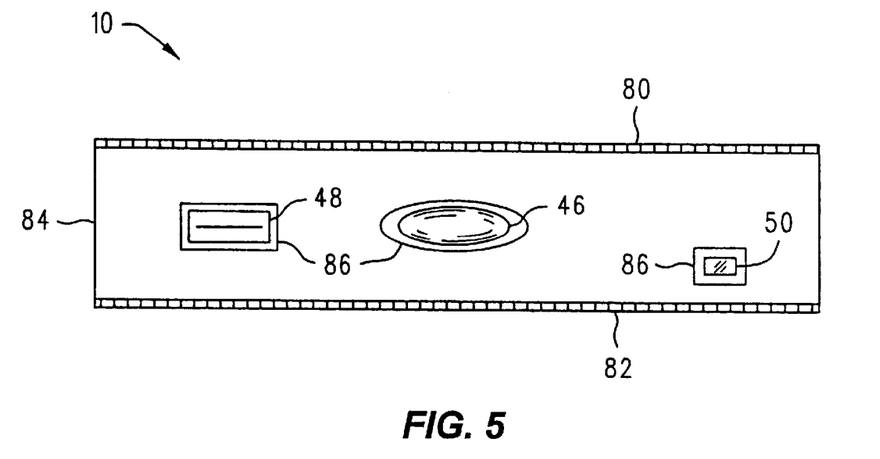
FIG. 5 is an end view in elevation of the spine portion of the jacket showing the openings to allow access to the communication ports and mode selection switch of the scanner apparatus.

As was briefly mentioned above, the housing 12 of the scanner apparatus 10 may be provided with a scanning device 30 which may comprise any of a wide range of scanning devices well-known in the art. By way of example, in one preferred embodiment, the scanning device 30 may include a contact image sensor (CIS) assembly 34 which may be slidably mounted within the housing 12 so that the CIS may move back and forth underneath the transparent platen 28, generally in the directions indicated by arrows 36. See FIGS. 3 and 6. The contact image sensor (CIS) 34 may be connected to a displacement apparatus 38 which moves the CIS 34 back and forth underneath the platen 28 to accomplish scanning of the object. The CIS 34 may be connected to image data processing apparatus 40 via a suitable communication link (e.g., by "ribbon" cable 42) so that image data (not shown) produced by the contact image sensor (CIS) 34 may be collected and processed (if necessary or desired) by the image data processing apparatus 40. The image data processing apparatus 40 may also be responsive to one or more mode selection switches (e.g., switch 46) to allow the user to operate the image data processing apparatus 40 as necessary to accomplish scanning of the object. The image data processing apparatus 40 may also be connected to one or more communication ports, such as a universal serial bus (USB) port 48 and/or an infra-red serial port 50, as best seen in FIG. 5, to allow image data (not shown) collected by the scanner apparatus 10 to be transferred to an external device, such as a personal computer (not shown). In one embodiment, the scanner apparatus 10 may derive the electrical power required for operation from the USB port 48. Alternatively, the scanner apparatus 10 may be provided with an on-board power source, such as a battery 52, to allow the scanner apparatus 10 to be operated as a "stand-alone" device, i.e., without the need to be connected to external devices, such as power supplies, computers, etc.

The scanner apparatus 10 according to the present invention may be operated in any of a wide variety of ways to accomplish a wide variety of scanning tasks. For example, the user may use the scanner apparatus 10 in a manner akin to that of a conventional flatbed scanner by placing the scanner apparatus 10 on any convenient work space, such as a desk, and then placing the object (e.g., a piece of paper with written text or graphics provided thereon) on the transparent platen 28. The user may then initiate the scanning operation by operating one or more of the mode selection switches (e.g., switch 46) in the appropriate manner or manners appropriate for the particular type of operating system utilized by the image data processing apparatus 40. After the scanning operation is complete, the user may transfer or "download" the image data to a separate device (e.g., a personal computer) via one or more of the communication ports 48, 50.

If the scanner apparatus 10 is no longer needed, the user may close the jacket 14 over the scanner housing 12 and store the assembly on a bookshelf or other such area. The configuration of the scanner housing 12 and jacket 14 is such that the assembly emulates a conventional notebook or multi-ring binder, thereby encouraging the user to store and transport the scanner apparatus 10 in much the same way as he or she would store and transport a multi-ring binder.

In another type of application, the user may remove the scanner housing 12 from the jacket 14 to allow the user to scan large or bulky objects that do not readily lend themselves to be positioned over the transparent platen 28 while the scanner apparatus 10 is positioned on a desk or a work table. For example, a user may use the scanner apparatus 10 to scan an object hanging on a wall, such as a large map, or a framed document or picture. In order to scan such an object, the user would manually hold the scanner housing 12 over the object so that the portion of the object to be scanned is located adjacent the transparent platen 28. The user may ensure proper alignment by looking through the window portion 32 on the back side 18 of the housing 12 which allows the user to see at least a portion (and preferably the essentially the entirety) of the part of the object that is positioned adjacent the transparent platen 28 on the front side 16 of the housing 12. After the housing 12 has been properly aligned, the user may then scan the object by operating he mode selection switch or switches (e.g. switch 46) in the appropriate manner. In this regard, it is generally preferable to locate at least one of the mode selection switches (e.g., switch 46) on the spine side 26 of the housing 12 to allow the user to operate the scanner device 10 even though the entire front side 16 of the housing 12 is positioned against the object being scanned and is therefore inaccessible to the user.

After the desired portion of the object has been scanned, the user may then transfer or "download" the image data to an external device (e.g., a personal computer) in the manner already described. Alternatively, the user may choose to place the scanner housing 12 back in the jacket 14 and store the assembly until such time as the user desires to download the image data. In still another alternative application, the user may need to transport the assembly to another location before downloading the image data. In any event, the overall configuration of the scanner apparatus 10 is such that it emulates a conventional notebook or multi-ring binder, thereby encouraging the user to store or transport the scanner apparatus 10 in a manner similar to the way he or she would store or transport a conventional notebook or multi-ring binder.

Alternatively, one or more of the foregoing scanning tasks could be accomplished without the need to first remove the scanner device 10 from the jacket 14. For example, scanning of a document or picture hanging on a wall could be accomplished with the jacket 14 in place, but by opening both the front and back cover portions 80 and 82 of jacket 14 to expose the front and back sides 16 and 18 of the scanner device 10.

A significant advantage of the scanner apparatus 10 according to the present invention is that the overall configuration of the scanner housing 12 and jacket 14 emulates a conventional notebook or multi-ring binder. This emulation encourages the user to transport and store the scanner apparatus 10 in much the same way as he or she would transport and store a conventional notebook, thereby allowing the user to free-up desk space that may otherwise normally be occupied by a conventional flatbed scanner, which is not so easily stored. The jacket 14 also serves as an outer "skin" to protect the housing 12 of the scanner apparatus 10 during storage and, particularly, transport, which provides additional protection against damage.

Another significant advantage of the scanner apparatus 10 is that the window portion 32 provided on the back side 18 of the housing 12 allows the user to more easily align the scanner apparatus 10 over the object being scanned to ensure that the desired portion of the object is scanned. This feature is particularly beneficial when attempting to scan large objects, such as large maps or other large documents, and generally allows the user to capture (i.e., scan) the desired portion of the object on the first attempt. Still another advantage of the scanner apparatus 10 is that it may be entirely self-contained, thereby eliminating the need to have the scanner apparatus 10 connected to external devices (e.g., power supplies, external computers, or the like) in order to accomplish the scanning process. Accordingly, a scanner apparatus 10 according to the present invention is highly portable and may be carried around by the user who may take "snap-shot" scans of almost any object imaginable.

Having briefly described the scanner apparatus 10 according to the present invention, as well as some of its snore significant features and advantages, the various embodiments of the scanner apparatus according to the present invention will now be described in detail.

Referring back now to FIGS. 1 and 2, a scanner apparatus 10 according to the present invention may include a scanner housing 12 and a jacket 14. The scanner housing 12 is sized so that it may be releasably engaged with the jacket 14. For example, when the housing 12 is engaged with the jacket 14, the combination emulates a conventional notebook or multi-ring binder, as best seen in FIG. 1. Alternatively, the scanner housing 12 may be removed from the jacket 14 which allows the scanner 10 to be used to scan any of a wide range of objects, such as large maps or framed documents or graphics that may be hanging on a wall. Certain exemplary uses of the scanner apparatus 10 will be described in greater detail below.

Figure 3:
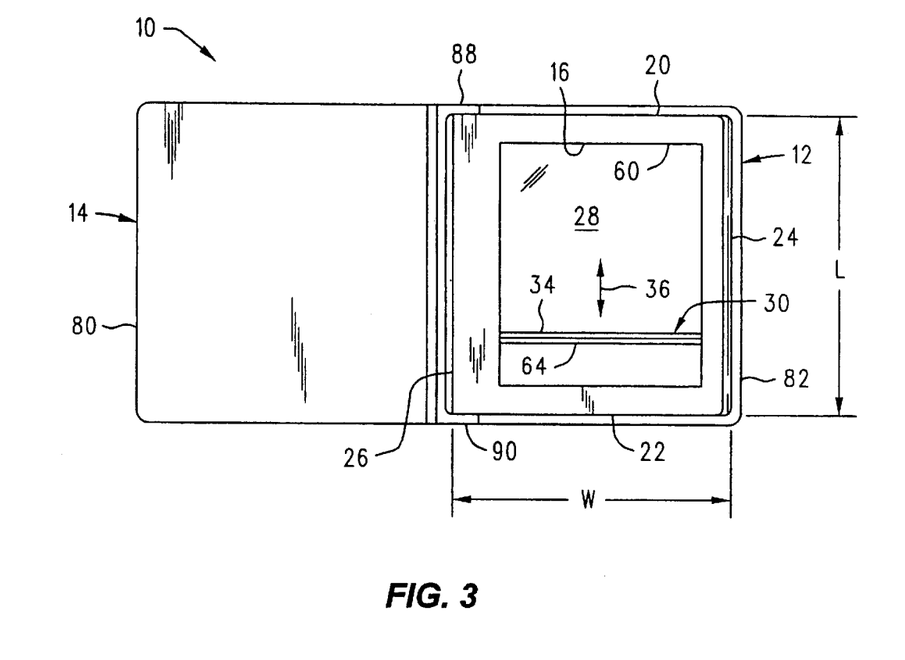
FIG. 3 is a plan view of the scanner apparatus with the front cover of the jacket opened to expose the transparent platen on the front side of the scanner housing.
Figure 4:
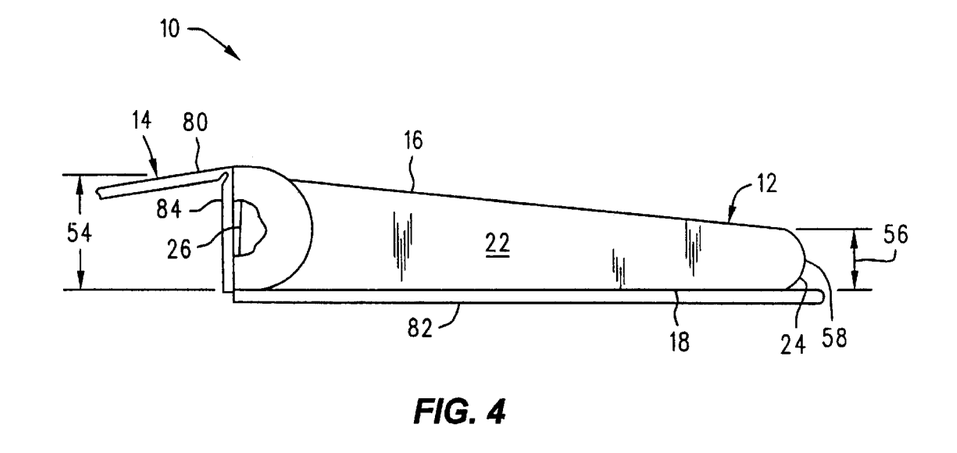
FIG. 4 is a side view in elevation of the scanner apparatus and jacket.

The scanner housing 12 may include a front side 16 and a back side 18 that are held in generally spaced-apart relation by a top side wall 20, a bottom side wall 22, an end side wall 24, and a spine wall 26, as best seen in FIGS. 1–3. It is preferred, but not required, that the scanner housing 12 be tapered so that a distance 54 separating the front and back sides 16 and 18 at about the spine wall 26 is greater than a distance 56 separating the front and back sides 16 and 18 at about the end side wall 24, as best seen in FIG. 4. In accordance with the desire to have the scanner apparatus 10 emulate a conventional notebook or multi-ring binder, it is preferred that the distance or thickness 54 at the spine wall 26 be in the range of about 4.0 cm to about 5.0 cm (4.5 cm preferred) and that the distance or thickness 56 at the end 24 be in the range of about 3.2 cm to about 3.9 cm (3.4 cm preferred). Alternatively, other thicknesses could also be used.

Also in accordance with the foregoing considerations, it is preferred that the housing 12 be provided with a length L and a width W that are within the range of lengths and widths of commonly used conventional notebooks or multi-ring binders. By way of example, in one preferred embodiment, the length L of the housing may be in the range of about 32 cm to about 35 cm (34 cm preferred), and the width W of the housing 12 may be in the range of about 24 cm to about 27 cm (25 cm preferred). Alternatively, other lengths and widths may also be used. Also, in one preferred embodiment, the end side 24 may include a rounded nose portion 58, although it is not required.

The housing 12 may be made from any of a wide range of materials (e.g., metals or plastics) suitable for the intended application. Consequently, the present invention should not be regarded as limited to housing comprising any particular material. In one preferred embodiment, the housing 12 may comprise a two piece or "clam-shell" structure having a top piece 92 and a bottom piece 94. Both the top and bottom pieces 92 and 94 may be fabricated from an acrylonitrile butadiene styrene (ABS) plastic, although other materials may be used.

Figure 6:
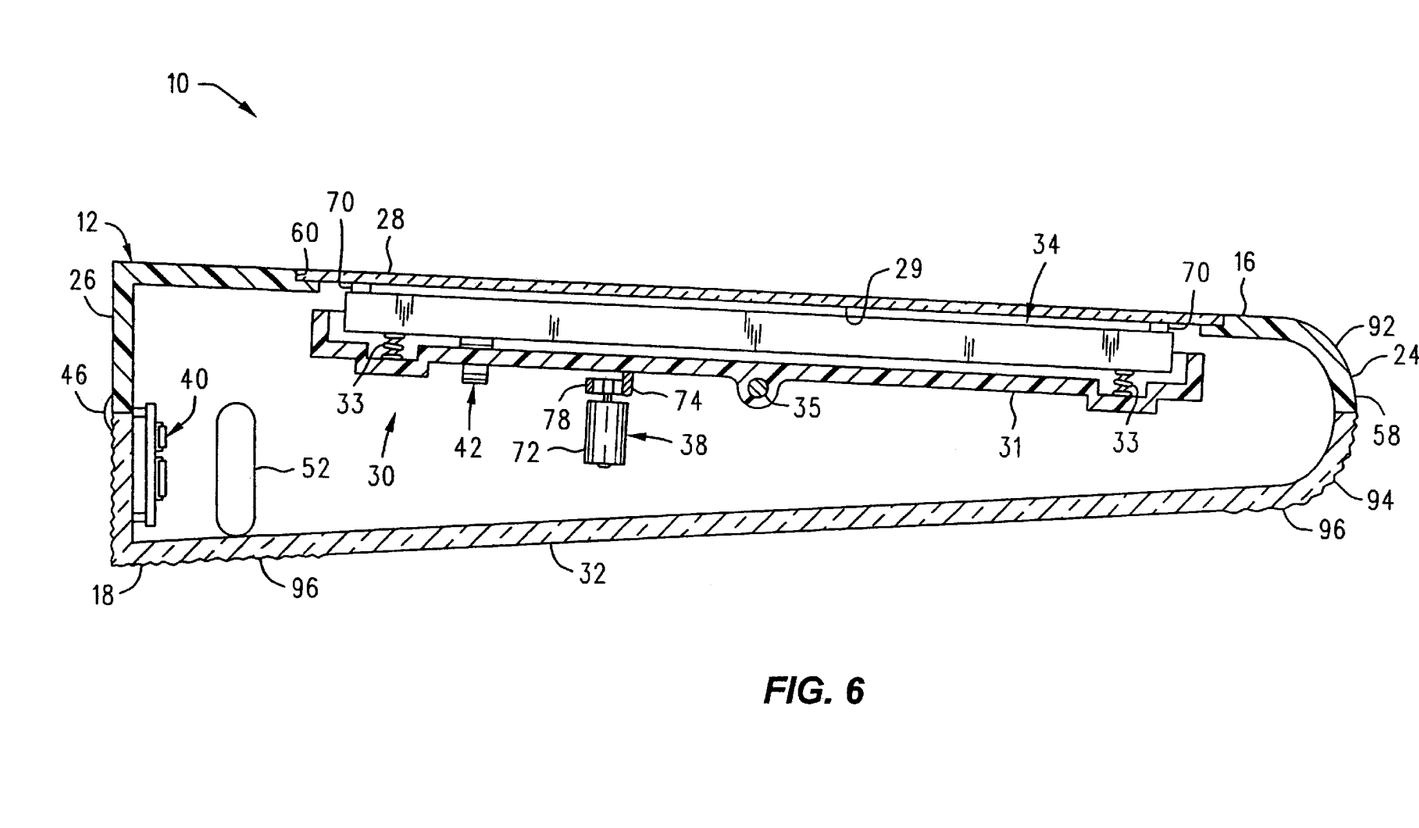
FIG. 6 is a cross-section view in elevation of the scanner apparatus showing the details of the scanning device contained therein.

The front side 16 of housing 12 may be provided with a transparent platen 28 to allow the scanning device 30 to scan an object (not shown) positioned adjacent the transparent platen 28. In one preferred embodiment, the front side 16 of housing 12 may be provided with a central aperture 60 (FIG. 3) that is sized to receive the transparent platen 28. The arrangement is such that the transparent platen 28 is generally flush with the front side 16 of housing 12, as best seen in FIG. 6. Alternatively, other arrangements could be used to provide the transparent platen 28 to the front side 16 of housing 12.

The transparent platen 28 may comprise any of a wide range of transparent, plate-like materials suitable for the intended application. In one preferred embodiment, the transparent platen 28 is made from glass, although other materials may be used. The transparent platen 28 may be secured within the central aperture 60 in the front side 16 of housing 12 by any convenient fastening device or system (e.g., by mechanical fasteners or by an adhesive) well-known in the art. By way of example, in one preferred embodiment, the transparent platen 28 may be secured to the central aperture 60 by any of a wide range of suitable adhesives which are readily commercially available. Since the details of providing transparent platens to scanner housings are not necessary to understand or describe the present invention, the particular mounting arrangements utilized in one preferred embodiment of the invention will not be described in further detail herein.

Figure 7:
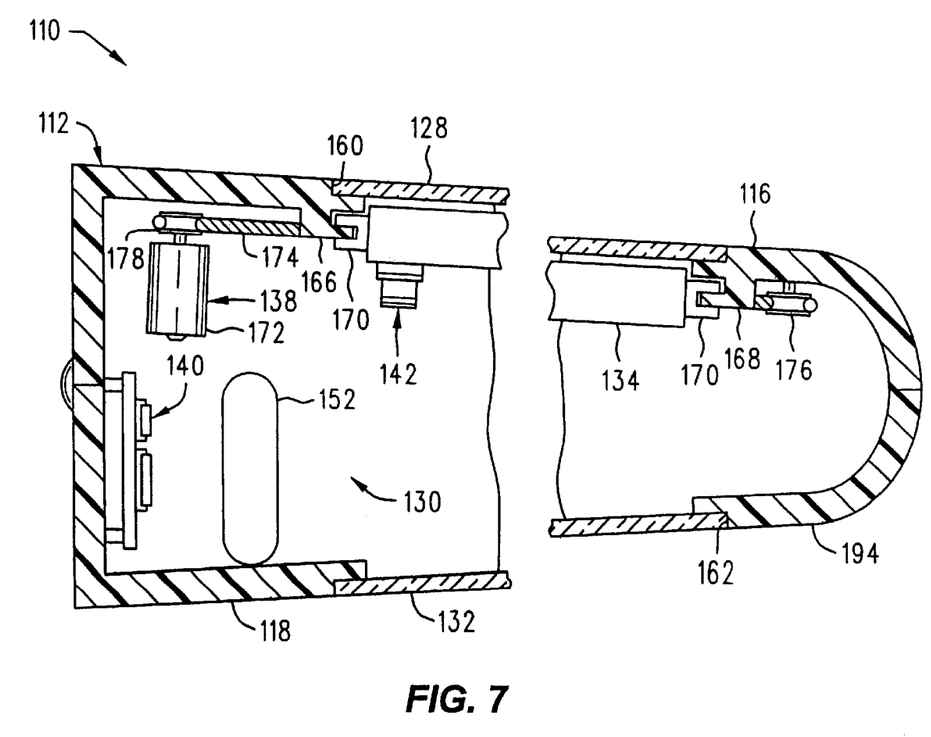
FIG. 7 is a cross-section view in elevation of another embodiment of the scanner apparatus.

The back side 18 of the housing 12 may also be provided with a window portion 32 that allows a user to see at least a portion, and preferably nearly the entirety, of the object positioned adjacent the transparent platen 28 on the front side 16 of housing 12. In one preferred embodiment, the window portion 32 comprises an integral portion of the bottom piece 94 of the two piece or "clam shell" housing structure. Alternatively, the window portion may comprise a separate element, as best seen in FIG. 7 and as will be described in greater detail below. The entire bottom piece 94 of the two piece or "clam shell" housing structure may be fabricated from a transparent material, such as ABS plastic. It is preferred, but not required, that the window portion 32 be provided with a smooth surface finish to allow a user to more easily observe the document being scanned. The remaining portions of the bottom piece 94 may be provided with a textured surface 96 to provide such textured portions with a translucent quality. Alternatively, the entire bottom piece 94 of the two piece or "clam shell" structure of the housing 12 could be provided with a relatively smooth, non-textured finish.

It is also generally preferred that the material comprising the window portion 32 and the bottom piece 94 of the housing 12 be tinted to minimize the amount of stray light entering the interior of the scanner. However, the tinting provided should not be so dark as to prevent or make it difficult for the user to observe the position of the object against the transparent platen 28. Generally speaking, a tint that provides a transmittance in the range of about 10% to about 30% (15%–20% preferred) will prove satisfactory. Alternatively, tints providing transmittances outside this range may also be used. The tint may also comprise any of a wide range of colors or hues. By way of example, in one preferred embodiment, the ABS plastic comprising the back half portion and window portion 32 of housing 12 may be provided with a dark blue or grey tint.

Referring back now to FIG. 6, the housing 12 of scanner apparatus 10 may be provided with any of a wide range of scanning devices 30 that are well-known in the art. Consequently, the present invention should not be regarded as limited to any particular scanning device 30. By way of example, in one preferred embodiment, the scanning device 30 contained within the housing 12 may comprise a contact image sensor or CIS 34, a displacement apparatus 38 for moving the contact image sensor 34 back and forth underneath the transparent platen 28 generally in the directions indicated by arrows 36, and an image data processing apparatus 40. The electrical power required to operate the scanner device 10 may be provided via the USB port 48, since such ports are configured to provide electrical power. Alternatively, the scanner device 10 may be provided with its own power source, such as a battery 52.

The contact image sensor 34 may comprise an integrated lens and detector system for producing image data (not shown) representative of an illuminated scan line. The contact image sensor 34 may also include a light source 64 (FIG. 3) for illuminating the scan line on the object being scanned. Alternatively, the light source 64 may comprise a separate element. The contact image sensor 34 may comprise any of a wide range of contact image sensors well-known in the art and that are readily commercially available. By way of example, in one preferred embodiment, the contact image sensor may comprise a model T-302 contact image sensor, available from Toshiba of Japan. The foregoing contact image sensor includes a tri-color (e.g., red, green, blue) light emitting diode (LED) illumination system to accomplish color scanning. Alternatively, if the CIS does not include an integral illumination system, then the scanner device 30 may be provided with a separate light source, such as an array of light emitting diodes (LEDs), although other types of light sources could also be used.

The contact image sensor 34 and light source 64 may be mounted within a carriage 31 which is in turn slidably mounted within the housing 12 so that the assembly is free to move back and forth generally in the directions indicated by arrows 36 (FIG. 3). While any of a wide variety of mounting arrangements well-known in the art may be used, in one preferred embodiment, the CIS 34 and light source 64 are supported in the carriage 31 by a pair of resilient elements, such as springs 33, which bias the CIS 34 against the back side 29 of platen 28. A pair of bearing "shoes" 70 may be mounted to the CIS 34 to provide a low friction engagement with the back side 29 of platen 28. The carriage 31 may be slidably mounted on a rod 35 which in turn may be secured to the top and bottom side walls 20, 22 of housing 12. The arrangement allows the carriage 31, thus CIS 34, to move back and forth underneath the platen 28. Alternatively, other mounting arrangements could also be used, as will be discussed in greater detail below.

The displacement apparatus 38 moves the carriage 31 (thus CIS 34 and light source assembly 64) back and forth underneath the transparent platen 28 in response to command signals provided by the image data processing apparatus 40. The displacement apparatus 38 may comprise any of wide range of devices and arrangements that are well-known in the art for moving an object back and forth along a guide rod. Consequently, the present invention should not be regarded as limited to any particular type of displacement apparatus 38. By way of example, in one preferred embodiment, the displacement apparatus 38 may comprise a motor 72 which is connected to the carriage 31 via a drive belt 74. One or more pulleys (not shown) may be required to transfer the movement of the drive belt 74 to the carriage 31 and to allow the drive belt 74 to engage the drive sprocket 78 provided on the motor 72.

The CIS 34 and light source assembly 64 may be connected to the image data processing apparatus 40 by any convenient device, such as a ribbon cable 42, which will allow electrical power to be provided to the CIS and light source assembly 64 and which will allow image data signals produced by the CIS 34 to be provided to the image data processing apparatus.

The image data processing apparatus 40 may be positioned near the spine wall 26 so as not to obstruct the space between the transparent platen 28 and the window portion 32, as best seen in FIG. 6. The image data processing apparatus 40 may comprise any of a wide range of image data processing apparatus that are well-known in the art. Accordingly, the present invention should not be regarded as limited to any particular type of image data processing apparatus. Also, since image data processing apparatus are well-known in the art and are not required to describe and understand the present invention, the particular image data processing apparatus 40 utilized in one preferred embodiment will not be described in further detail herein.

Regardless of the particular type of image data processing apparatus that is utilized, it will be generally desirable to provide the image data processing apparatus 40 with one or more communication ports to allow data to be transferred or "downloaded" to an external computer. While any of a wide range of well-known communication ports and formats may be utilized, in one preferred embodiment, the image data processing system 40 may be provided with a universal serial bus (USB) port 48 and an infra red (IR) serial port 50. The ports 48 and 50 may be provided on the housing 12 at any convenient location. By way of example, in one preferred embodiment, both the USB port 48 and the IR serial port 50 are provided on the spine wall 26 of housing 12, as best seen in FIG. 5. Alternatively, the communication ports may be provided at other locations on the housing 12.

The image data processing apparatus 40 may also be provided with one or more mode selection switches (e.g., switch 46) to allow the user to operate the scanner apparatus 10. In one preferred embodiment, the mode selection switch 46 is provided on the spine wall 26 of housing 12. The mode selection switch 46 may be operated by the user when the scanner apparatus 10 is used as a conventional, table-top flatbed scanner. The position of the mode selection switch 46 on the spine wall 26 also allows the user to operate the scanner apparatus 10 if the entire front side 16 of the scanner 10 is positioned against the object being scanned. Alternatively, a greater number of mode selection switches may be provided at various locations depending on the particular operating system utilized by the image data processing apparatus 40 and depending on the particular design of the scanner apparatus 10.

The jacket 14 may comprise a front cover portion 80 and a back cover portion 82 that are connected together by a spine portion 84. The front and back cover portions 80 and 82 may be hinged to the spine portion 84 so that the front and back cover portions 80 and 82 may be opened and closed to expose the front and back sides 16 and 18 of the housing assembly 12. The spine portion 84 may be provided with a plurality of apertures 86 sized and positioned so that they expose the various communication ports (e.g., 48 and 50) and the mode selection switch 46 provided on the spine wall 26 of the housing 12 when the housing 12 is positioned in the jacket 14. See FIG. 5.

The jacket 14 may also be provided with first and second mounting members or "ears" 88, 90 which are adapted to releasably engage the housing assembly 12. The mounting members 88, 90 may be configured to provide some holding force (e.g., a "snap" type of engagement or a frictional engagement) to retain the housing 12 within the jacket 14 yet allow the housing assembly 12 to be easily removed from the jacket assembly 14. In an alternative embodiment, the jacket 14 could be more permanently attached to the housing assembly 12 (such as by screws or other such fasteners), thereby discouraging the user from separating the housing assembly 12 from the jacket 14.

The jacket 14 may be made from any of a wide range of materials suitable for the intended application. Consequently, the present invention should not be regarded as being limited to jackets comprising any particular material. By way of example, in one preferred embodiment, the front and back cover portions 80 and 82 are made from "ballistic" type nylon fabric and the spine portion 84 is molded from ABS plastic. The front and back cover portions 80 and 82 may be attached to the spine portion 84 by screws (not shown), although other fasteners could also be used. Alternatively, the front and back cover portions 80 and 82 may be affixed to the spine portion 84 by any of a wide range of suitable adhesives that are readily commercially available. In still another configuration, the front and back cover portions 80 and 82 may comprise integral portions of the spine portion 84. The first and second mounting members or "ears" 88 and 90 may be made from ABS plastic and may comprise integral portions of the spine portion 84. Alternatively, the first and second mounting members or "ears" 88 and 90 may comprise separate parts and may be attached to the spine portion 84 by any of wide range of fastening systems or devices (e.g., adhesives or screws).

The front and back cover portions 80 and 82 may be made to have any convenient size. However, it is preferred, but not required, that the front and back cover portions 80 and 82 be sized so that they are slightly Larger in width and length than the width W and length L of the housing assembly 12, as best seen in FIG. 3. Providing front and back cover portions 80 and 82 that are slightly larger than the housing assembly 12 provides additional protection to the housing assembly 12 and provides further emulation of the notebook configuration of the scanner apparatus 10.

As was briefly described above, the scanner apparatus 10 according to the present invention may be operated in any of a wide variety of ways to accomplish a wide variety of scanning tasks. For example, the user may use the scanner apparatus 10 in a manner similar to that of a conventional flatbed scanner by placing the scanner apparatus 10 on a desk or other flat surface and then placing the object to be scanned on the transparent platen 28. The user may then initiate the scanning operation by operating one or more of the mode selection switches (e.g., switch 46) in the appropriate manner or manners. After the scanning operation is complete, the user may transfer or "download" the image data to a separate device (e.g., a personal computer) via one or more of the communication ports (e.g., either the USB port 48 or the IR port 50).

If the scanner apparatus 10 is no longer needed, the user may close the jacket 14 over the scanner housing 12 and store the assembly on a bookshelf or other such device. The configuration of the scanner housing 12 and jacket 14 is such that the assembly emulates a conventional notebook or multi-ring binder, thereby encouraging the user to store and transport the scanner apparatus 10 in much the same way as he or she would store and transport a multi-ring binder.

In another type of application, the user may remove the scanner housing 12 from the jacket 14 to allow the user to scan large or bulky objects that do not readily lend themselves to be positioned over the transparent platen 28 while the scanner apparatus 10 is positioned on a work table or desk. For example, a user may use the scanner apparatus 10 to scan an object hanging on a wall, such as a large map, or a framed document or picture. In order to scan such an object, the user would manually position the scanner housing 12 over the object so that the portion of the object to be scanned is located adjacent the transparent platen 28. The user may ensure proper alignment by looking through the window portion 32 on the back side 18 of the housing 12 which allows the user to see at least a portion (and preferably the essentially the entirety) of the part of the object that is positioned adjacent the transparent platen 28 on the front side 16 of the housing 12. After the housing 12 has been properly aligned, the user may then scan the object by operating the mode selection switch or switches (e.g., switch 46) in the appropriate manner.

After the desired portion of the object has been scanned, the user may then transfer or "download" the image data to an external device (e.g., a personal computer) in the manner already described. Alternatively, the user may choose to place the scanner housing 12 back in the jacket 14 and store the assembly until such time as the user desires to download the image data. In still another alternative, the user may need to transport the assembly to another location before downloading the image data. In any event, the overall configuration of the scanner apparatus 10 is such that it emulates a conventional notebook or multi-ring binder, thereby encouraging the user to store or transport the scanner apparatus 10 in a manner similar to the way he or she would store or transport a conventional notebook or multi-ring binder.

In a similar application to the one just described, the scanner apparatus 10 may be used to scan an object (e.g., a map) positioned on a generally horizontal surface, such as a desk, by simply inverting the scanner apparatus 10 to place the transparent platen 28 in contact with the object to be scanned. Here again, the user may utilize the window portion 32 provided on the back side 18 of the housing 12 to ensure that the scanner 10 is positioned over the desired portion of the object. The user may then actuate the mode selection switch 46 on the spine wall 26 as necessary to initiate the scanning process.

Another embodiment 110 of the scanner apparatus according to the present invention is shown in FIG. 7. The second embodiment 110 is essentially identical to the first embodiment 10 just described, except that it provides alternative mounting structures for the window portion and CIS. More specifically, the second embodiment 110 of the scanner device may comprise a housing 112 having a front side 116 and a back side 118. The front side 116 of housing 112 may be provided with a central aperture 160 sized to receive a transparent platen 128 in the manner already described for the first embodiment 10. However, as was briefly mentioned above, the back side 118 of housing 112 may also be provided with a central aperture 162 sized to receive a separate transparent window portion 132. The transparent window portion 132 may comprise a glass or plastic plate-like member and may be secured within the central aperture 162 of the back side 118 by any convenient mounting structure or system already described for the transparent platen. The provision of a separate transparent window portion 132 allows the bottom piece 194 of the two piece or "clam shell" housing structure 112 to be fabricated from a non-transparent material, if desired. By way of example, in one preferred embodiment, the bottom piece 194 may be fabricated from ABS plastic, although other materials may also be used. It is preferred, but not required, that the window portion 132 be tinted in the manner already described for the first embodiment 10.

The second embodiment 110 of the scanner apparatus may also be provided with an alternative scanner device 130. Essentially, the alternative scanner device 130 may include a contact image sensor (CIS) 134 that is slidably mounted on a pair of elongate rails 166 and 168 which may comprise integral components of the housing 112. The CIS assembly 134 may be provided with a pair of bearing shoes 170 to provide a low friction engagement with the rails 166 and 168.

The displacement apparatus 138 moves the CIS assembly 34 back and forth underneath the transparent platen 128 in response to command signals provided by the image data processing apparatus 140. The displacement apparatus 138 may comprise a motor 172 which is connected to the CIS assembly 134 via a drive cable (e.g., wire rope) 174. One or more pulleys 176 may be required to transfer the movement of the drive cable 174 to the CIS 134 and to allow the drive cable 174 to be connected to the capstan 178 provided on the motor 172. The CIS 134 may be connected to the image data processing apparatus 140 by a ribbon cable 142, although other arrangements are possible. Of course, the scanner device 110 may also be provided with a suitable power source, such as a battery 152, to allow "stand alone" operation of the scanner device 110.

It is contemplated that the inventive concepts herein described may be variously otherwise embodied and it is intended that the appended claims be construed to include alternative embodiments of the invention except insofar as limited by the prior art.

What is claimed is:

1. Scanner apparatus comprising:

a housing having a front side and a back side, the front side of said housing including at least one opening therein, the back side of said housing including at least one opening therein;

a scanning device mounted within said housing;

a transparent platen mounted within the at least one opening in the front side of said housing, said transparent platen allowing an object positioned adjacent said transparent platen to be scanned by said scanning device; and at least one transparent window member mounted within the at least one opening in the back side of said housing, said at least one transparent window member allowing a user to view at least a portion of the object positioned adjacent said transparent platen.

2. The scanner apparatus of claim 1, wherein said scanning device comprises:

a contact image sensor moveably mounted within said housing so that said contact image sensor may be moved back and forth underneath said transparent platen;

displacement apparatus operatively associated with said contact image sensor, said displacement apparatus moving said contact image sensor back and forth underneath said transparent platen to accomplish scanning of the object positioned adjacent said transparent platen; and image data processing apparatus operatively associated with said contact image sensor, said image data processing apparatus receiving image data signals produced by said contact image sensor.

3. The scanner apparatus of claim 2, wherein said displacement apparatus comprises:

at least one drive belt connected to said contact image sensor; and at least one motor mounted within said housing, said at least one motor being operatively engaged with said at least one drive belt.

4. The scanner apparatus of claim 3, further comprising an electrically conductive ribbon cable having a first end and a second end, the first end of said electrically conductive ribbon cable being electrically connected to said contact image sensor, the second end of said electrically conductive ribbon cable being electrically connected to said image data processing apparatus.

5. The scanner apparatus of claim 1, further comprising a communication port operatively associated with said scanning device to allow data to be transferred between said scanning device and a device external to said scanner apparatus.

6. The scanner apparatus of claim 5, wherein said communication port comprises a universal serial bus (USB) port, said USB port being mounted to said housing.

7. The scanner apparatus of claim 1, wherein said transparent platen comprises a generally flat, plate-like glass member.

8. The scanner apparatus of claim 1, wherein said transparent window member comprises a generally flat, plate-like glass member.

9. The scanner apparatus of claim 1, wherein said housing comprises:

a first housing member portion; and a second housing member portion sized to be mounted to said first housing member portion, said first and second housing member portions together defining the front and back sides of said housing, said first and second housing member portions also together defining first and second opposed side wall portions of said housing and first and second opposed end wall portions of said housing.

10. The scanner apparatus of claim 1, further comprising a scanner actuation switch mounted to the first opposed side wall portion of said housing.

11. The scanner apparatus of claim 10, further comprising a universal serial bus (USB) port electrically connected to said scanning device, said universal serial bus port being mounted to the first opposed end wall portion of said housing.

12. The scanner apparatus of claim 1, further comprising a front cover portion removeably mounted to said housing so that said front cover portion may be closed to cover the front side of said housing and opened to expose the front side of said housing.

13. The scanner apparatus of claim 12, wherein said front cover portion includes a first mounting member and a second mounting member, said first and second mounting members being adapted to releasably engage said housing so that said front cover portion may be removed from said housing.

14. Scanner apparatus, comprising:

a housing having a front side and a back side, the front side of said housing defining an opening therein, the back side of said housing defining an opening therein;

a transparent platen mounted within the opening in the front side of said housing;

a transparent window member mounted within the opening in the back side of said housing;

a contact image sensor moveably mounted within said housing so that said contact image sensor may be moved back and forth underneath said transparent platen;

a drive belt mounted to said contact image sensor;

a motor mounted within said housing, said motor being engaged with said drive belt, said motor and said drive belt moving said contact image sensor back and forth underneath said transparent platen;

image data processing apparatus electrically connected to said contact image sensor; and a universal serial bus (USB) port mounted to said housing, said universal serial bus port being electrically connected to said image data processing apparatus.

15. The scanner apparatus of claim 14, further comprising:

a first guide rail assembly integral with said housing; and a second guide rail assembly integral with said housing, said second guide rail assembly being located a spaced distance from said first guide rail assembly, said contact image sensor being moveably mounted to said first and second guide rail assemblies.

16. The scanner apparatus of claim 15, further comprising:

at least one resilient element operatively associated with said contact image sensor, said at least one resilient element biasing said contact image sensor against said transparent platen.

17. A method for scanning an object, comprising:

providing a scanner apparatus having a housing with a front side and a back side, the front side of the housing having a transparent platen therein, the back side of the housing having a transparent window therein;

positioning the object against the transparent platen;

viewing at least a portion of the object positioned against the transparent platen through the transparent window on the back side of the housing to ensure that a desired area of the object will be scanned by the scanner apparatus; and actuating the scanner apparatus to scan the object.

18. A method for scanning an object, comprising:

positioning a transparent platen of a scanner apparatus against the object;

viewing at least a portion of the object positioned against the transparent platen of the scanner apparatus through a transparent window provided on a back side of the scanner apparatus to ensure that a desired area of the object will be scanned by the scanner apparatus; and operating the scanner apparatus to scan the object.

19. The method of claim 18, further comprising the step of repositioning the transparent platen of the scanner apparatus against the object if the desired area of the object would not have been scanned by the scanner apparatus.

20. Scanner apparatus, comprising:

a housing having a front side and a back side;

scanning means mounted within said housing for producing image data representative of an object being scanned;

transparent platen means provided on the front side of said housing for allowing the object to be scanned by said scanning means; and window means provided on the back side of said housing for allowing a user to view at least a portion of the object positioned against said transparent platen means.

* * * * *